Dec. 29, 1970  H. DAHMS  3,551,109
METHOD AND APPARATUS FOR THE TITRATION OF CHLORIDE
AND BICARBONATE IN SERUM
Filed Dec. 13, 1967  3 Sheets-Sheet 1

United States Patent Office 3,551,109
Patented Dec. 29, 1970

3,551,109
METHOD AND APPARATUS FOR THE TITRATION OF CHLORIDE AND BICARBONATE IN SERUM
Harald Dahms, 22 Lakeview Road,
Ossining, N.Y. 10562
Filed Dec. 13, 1967, Ser. No. 690,270
Int. Cl. G01n 27/26, 27/42, 33/16
U.S. Cl. 23—230
46 Claims

ABSTRACT OF THE DISCLOSURE

A test for analyzing both chloride and bicarbonate in blood serum, and apparatus therefor. In a preferred embodiment the sample of serum is mixed with an acidic solution containing silver ions to precipitate a portion of the chloride and to drive off $CO_2$. The solution is then electrolyzed to produce additional silver ions (at an anode) and hydroxyl ions (at a cathode); the chloride end point is detected amperometrically, while the acid-base end point is detected by a pH electrode.

---

In recent years a great deal of attention has been paid to improving, simplifying and automating clinical analyses. An extensive discussion of the high degree of activity in that field up to 1963 is found in Chemical and Engineering News (Dec. 9, 1963, pp. 112–127; and Dec. 16, 1963, pp. 112–126 and 128), and the interest in the field has increased considerably since that time.

Analyses for four electrolytes (sodium, potassium, chloride and bicarbonate) in blood serum constitute a very large part (probably about 40%) of the workload of the average clinical laboratory. The four electrolyte tests are generally ordered as a battery by the physician. While analyses for sodium and potassium present little difficulty since their determination by flame photometry is essentially a fast and accurate method, there has been little progress in the development of analytical methods for bicarbonate and chloride. A good example of this situation is the only commercially available automatic instrument for carrying out the analysis for the four electrolytes: an "Auto Analyzer," referred to on p. 117 of the Dec. 9, 1963 Chemical and Engineering News, previously cited. In that instrument the tests for bicarbonate and chloride are done by conventional colorimetric procedures and the instrument is slow, complex and inaccurate.

More particularly, in passing through this Auto Analyzer the sample, after dilution, is first dialyzed (which takes several minutes) and then split into several streams, one of which is fed into a flame photometer for sodium and potassium analysis. Another stream is mixed with acid. The carbon dioxide produced by the reaction with acid is then released into adjacent bubbles of carrier gas and then transported with the carrier gas into a solution containing a slightly alkaline solution of an acid-base indicator. The acid-base indicator responds (slowly, within minutes) to the carbon dioxide content by a color change which is then measured colorimetrically. The chloride is measured by a modification of the colorimetric Schales and Schales method. Both colorimetric methods are known to have an accuracy of not better than ±5%, which is on the lower limit of acceptability according to modern clinical standards. Due to the slow steps involved, the result is available only about 10 minutes after the introduction of the sample into the apparatus. This presents serious problems in synchronization of these results with those of the flame photometer, which are available immediately. Furthermore, the instrument requires constant maintenance and a supply of numerous reagent solutions. The instrument has, however, had wide acceptance, its automatic features being an advance over previously existing techniques.

Other automatic equipment is limited to testing a single electrolyte of the 4-electrolyte battery. An instrument which has found widespread use for chloride analysis is the Cotlove titrator, which uses two pairs of silver electrodes, both of which are immersed in the sample. A constant direct current flows between one pair of electrodes (the coulometric electrodes) thus releasing a steady stream of silver ions into the sample. The silver ions react with the chloride ions to form insoluble silver chloride. In time, all of the chloride ions combine. At this point, the current across the other pair of electrodes (the amperometric electrodes) rapidly increases. When this current reaches a predetermined value, the instrument automatically stops a timer that was started at the beginning of the test. The elapsed time is a measure of the amount of chloride ion present in the sample. The sample need not be deproteinized.

Aside from the use of the Auto Analyzer as described above, bicarbonate determinations are hardly automated at all. The colorimetric test (used in the Auto Analyzer) can be employed or the bicarbonate can be measured by the volumetric or manometric Van Slyke method or by gas chromatographic analyzers.

The present invention provides a fast, simple, accurate test for both chloride and for bicarbonate, requiring no deproteinization of the sample. It is compatible with flame-photometric procedures, and provides the basis for simple, rapid, precise electrolyte tests which can be automated in a contemporary manner with relatively uncomplicated easily operated equipment requiring little maintenance and needing only the addition of one reagent solution. When combined with flame photometry, it makes it possible for all four electrolyte tests to be carried out on as little as 0.1 ml. of serum in only one or two minutes. The small volume of serum required is also a definite advantage over previous methods, not only in pediatric work but also on regular specimens, since an increasing number of tests have to be performed on a given volume of sample.

One aspect of this invention relates to a novel method for analyzing both chloride and bicarbonate in human serum. In a preferred embodiment, the serum is treated by adding a predetermined amount of strong acid and a predetermined amount of silver ion. The amount of added acid is sufficient to convert all the bicarbonate to carbon dioxide and leave an excess of acid; the $CO_2$ thus generated is driven out of the solution, as a gas. The amount of added silver ion is sufficient to combine with part of the chloride ion and remove it from solution as a precipitate of insoluble silver chloride, leaving a concentration of dissolved chloride ion which is less than the concentration of hydrogen ion in the acidified serum. The acid is preferably a strong chloride-free acid whose anion does not react with silver ion in the solution to form an insoluble or un-ionized compound.

A D.C. electric current is then passed through the solution, using a silver anode. As long as there are chloride ions in the solution, the silver ions generated at the silver anode will combine with the chloride ions, forming a precipitate of silver chloride. When, however, all the chloride ions have been thus removed from the solution, the continued passage of the current markedly increases the silver ion concentration; the endpoint can thereby be detected amperometrically.

The passage of the D.C. current (when suitable electrodes are employed) also results in the generation of hydroxyl ions at the cathode, as by electrolysis of the water of the solution according to the equation $$H_2O + e \rightarrow OH^- + \tfrac{1}{2} H_2$$

and also, in part, by discharge of hydrogen ions at the cathode (according to the equation $H^+ + e \rightarrow \frac{1}{2} H_2$). This neutralizes the acidity. The neutral endpoint can be detected by a pH meter in the solution.

One aspect of the invention relates to apparatus useful in carrying out the method described above. In a preferred embodiment, the apparatus includes an electrolysis cell having a silver anode and a suitable cathode (for generating the silver ions at the anode and the hydroxyl ions at the cathode), an amperometric endpoint detector (for detecting the appearance of silver ions which increase the concentration of electroactive species in the solution), and a glass electrode serving as a pH meter. Such a cell may be conveniently constructed by modifying the cell of a commercially available Cotlove chloride titrator by adding the glass electrode and replacing the silver cathode of the chloride titrator by an electrode designed to avoid or minimize cathode reactions which compete with hydroxyl ion production (and concomitant hydrogen evolution) described above; one such competing cathode reaction is the deposition of silver according to the equation $Ag^+ + e \rightarrow Ag$. In the preferred embodiment of the apparatus, there is also means for bubbling air through the solution to insure that substantially all the $CO_2$ generated by the acidification has been removed from the solution. To minimize foam formation owing to proteinaceous foam stabilizing materials present in the serum, it is preferred to have present an antifoam agent, of known type e.g. a dimethyl silicon liquid); one convenient way of adding this ingredient is to have a small amount thereof present on the walls of the sample cup to which the solution is added and in which the electrodes are inserted.

One preferred embodiment of the apparatus also includes a pair of counters for giving a direct readout of the chloride and bicarbonate concentrations as determined by the total quantities of electricity (coulombs) passed through the cell before the respective endpoints are reached. The counter for the chloride concentration may be similar to that used in the Cotlove chloride titrator (as described by Cotlove and Nishi in their article in Clinical Chemistry, vol. 7, No. 3, June 1961, pp. 285–291). In that device, the total current is measured by a timer which shuts off automatically when the endpoint is reached; the amperage through the cell is controlled at a constant predetermined value so that a measurement of time gives a measurement of total quantity of electricity. The counter used for the bicarbonate concentration may be of the same type, being shut off automatically when the pH meter indicates neutrality. It may be calibrated reversely (i.e., subtractively rather than additively), so that the longer the elapsed time the smaller will be the reading shown on the timer; in this way the timer will give a direct reading of the bicarbonate concentration.

As previously indicated, in the preferred form of the invention the serum is initially mixed with a dilution solution (reagent solution) containing silver ions. This reduces the amount of silver which must be generated electrolytically and thus reduces the analysis time. The amount of silver to be added in this dilution of the serum may be constant and need not be determined by a rough analysis for each sample of serum. The chloride ion concentration in human serum is generally within the range of about 85–125 mM. (i.e. 85–125 millimoles per liter) and the bicarbonate ion concentration is within the range of about 15–30 mM. By adding to 0.1 ml. of human serum 5 ml. of a reagent solution having a concentration of 1.5 mM. $HNO_3$ and 1.7 mM. $AgNO_3$ (that is, by adding $7.5 \times 10^{-5}$ mol of $H^+$ and $8.5 \times 10^{-5}$ mol of $Ag^+$ per ml. of serum), one can obtain a diluted solution whose chloride endpoint always appears before the acid-base endpoint. For example, if the serum has a concentration of 25 mM. $HCO_3^-$ and 110 mM. $Cl^-$, the constituents of the resulting solution made by mixing the foregoing reagent solution and serum (after formation of an AgCl precipitate and the release of $CO_2$) may be calculated as follows:

0.1 ml. of 25 mM. $HCO_3^- = 2.5 \times 10^{-6}$ mols $HCO_3^-$
5.0 ml. of 1.5 mM. $H^+ = 7.5 \times 10^{-6}$ mols $H^+$ Resulting solution $= 5.0 \times 10^{-6}$ mols $H^+$ 0.1 ml. of 110 mM. $Cl^- = 11.0 \times 10^{-6}$ mols $Cl^-$
5.0 ml. of 1.7 mM. $Ag^+ = 8.5 \times 10^{-6}$ mols $Ag^+$ Resulting solution $= 2.5 \times 10^{-6}$ mols $Cl^-$ If this solution is then electrolyzed, using a current of 10 ma., then, according to Farraday's law, the endpoint of the chloride liberated will occur after about 26 seconds and the endpoint of the acid titration after about 52 seconds of electrolyzation. Similarly, at other bicarbonate and chloride levels within the range found in human serum, there will be no overlap, or reversal of the order, of the endpoint times when the foregoing reagent solution is used.

It is, however, within the broader scope of the invention to use different amounts or concentrations of the reagent solution (or even to omit the silver from the reagent solution), with a corresponding undesirable lengthening of the time needed for the chloride analysis. In that case, the shut-off switch for the electrolysis current may be controlled by a device which responds only when both endpoints have been reached (e.g. a relay whose input circuit includes two relays, one for each endpoint, in parallel); in contrast, when the solution is such as to insure a chloride endpoint before the acid-base endpoint, it is sufficient to use a simpler circuit in which the electrolysis current is shut off merely when the acid-base endpoint is reached. Furthermore, if the acid-base endpoint occurs before the chloride endpoint, the continuing flow of electrolysis current through the now-basic solution (which current flow produces, as previously stated, silver ions and hydroxyl ions) causes the formation not only of silver chloride but also silver carbonates, hydroxides, oxides and mixtures or mixed compounds thereof, which accordingly decreases the accuracy of the chloride endpoint. Thus, it is preferred that the serum be diluted, as previously described so as to give a solution in which the chloride ion and hydrogen ion concentrations are such that when silver ions and hydroxyl ions are added at equal rates to that solution the chloride endpoint (i.e. the substantially full removal of the chloride ions from the solution as AgCl) occurs at about the same time as or, more preferably, prior to, the neutralization of the acidity. That is, in the diluted serum the hydrogen ion concentration should be about equal to or, more preferably, higher than, the chloride ion concentration.

The predilution with silver ions also has the advantage of increasing the life of the silver anode by decreasing the quantity of silver which must be removed during the electrolysis in order to attain the chloride endpoint.

In the most preferred form of the invention, the amount of acid used used for diluting the serum is such as to give a diluted serum whose hydrogen ion content is less than about $10^{-3}$ mols per ml. of serum; that is, one should not acidify the solution too much; otherwise too much hydroxyl ion must be added to reach the acid-base endpoint and the accuracy of the method is decreased.

The reagent solution will generally supply more than $2 \times 10^{-5}$ mols (preferably within the range of $2.5 \times 10^{-5}$ to $1 \times 10^{-4}$ mol) of added hydrogen ion per ml. of the serum, and less than $10^{-4}$ mol (preferably within the range of $5 \times 10^{-5}$ to $1 \times 10^{-4}$ mol) of added silver ion per ml. of the serum.

It is desirable to include in the reagent solution a supporting electrolyte, such as nitrate salt, to help reduce migration of silver ions to the cathode and to help eliminate electrical fields, in the solution, which could interfere with the mesaurement of pH. The concentration of the supporting electrolyte in the final diluted serum is preferably in the range of about 0.01–0.5 molar, more preferably about 0.05–0.5 M. While the supporting electrolyte could be furnished by the use of large amounts of acid, it is preferred to avoid this since, as previously discussed, it reduces the accuracy of the bicarbonate analysis. In a preferred form the acid concentration, after the dilution of the serum, is below about 0.001 M and the supporting electrolyte is supplied by the inclusion of a neutral salt. To avoid buffering effects as the neutral endpoint is approached, it is preferred to use salts of alkali metals (e.g. Na, K, Li, Rb, Cs). Where the solution is also to be subjected to flame photometry, in which the sodium and potassium ion concentrations of the serum are measured, it is best to avoid additions of salts of those two ions; here neutral lithium salts are preferred, and cesium and rubidium salts can be employed as well. The salts may be those of anions other than nitrate; for example, perchlorate ions, which do not form precipitates with the silver ion, may be used.

In the accompanying drawings, which illustrate certain embodiments of the invention.

Figure 1:
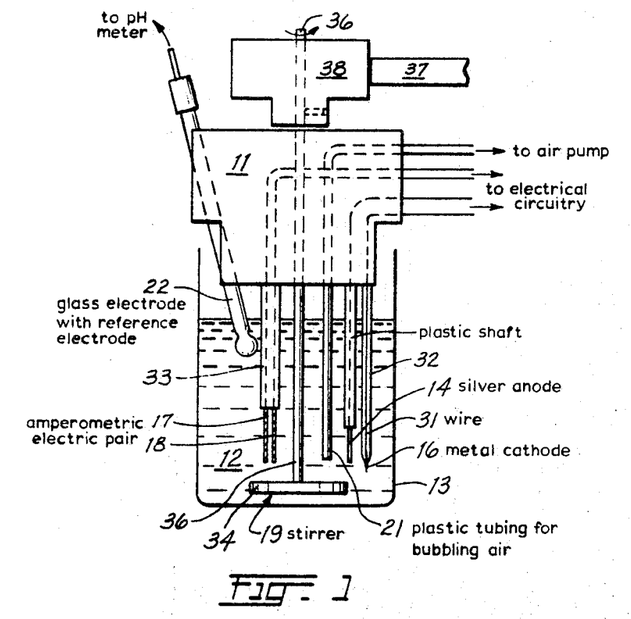
FIG. 1 is a view in elevation, partly in cross-section, showing the arrangement of electrolysis and detection elements immersed in the diluted sample to be tested.

In the structure shown in FIG. 1, there is a plastic block 11 which supports various elements intended to be immersed in the solution 12 being analyzed while the solution is within a container 13. These elements include: a silver anode 14, a cathode 16 (both connected to an electrical circuit which supplies a constant electrolysis current to the anode and cathode); a pair of amperometric electrodes 17, 18 (connected to an electrical circuit which supplies a constant voltage across these electrodes); a stirrer 19; a bubbler 21; and a pH electrode 22. The silver anode, the amperometric electrodes and the stirrer may all be the same as those used in the conventional Cotlove chloride titrator.

Figure 2:
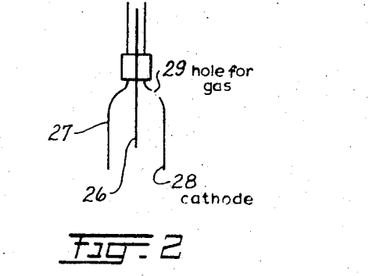
FIG. 2 is a view in elevation, in cross-section, showing another form of cathode.

To minimize competing electrolytic processes such as silver deposition resulting from diffusion of silver ions toward the cathode, the cathode 16 is made quite small (e.g. much less than one-fourth the area of the anode 14), and is situated at a slightly lower level than the bottom of the anode. For example, this exposed cathode may be a short length of platinum wire having an exposed metal surface area of less than about $10^{-2}$ cm.$^2$, e.g. about $3 \times 10^{-3}$ cm.$^2$, and it may be situated at a level below the bottom of the silver anode 14, which anode may be mounted vertically at a short distance (e.g. in the range of about 0.1 to a few cm.), measured horizontally, from the cathode. One may use other techniques to minimize the diffusion of silver ions and thereby decrease the current, owing to silver deposition on the cathode, to less than about 10%, preferably less than about 5%, of the total current flowing between the cathode and anode. For example, a cathode 26 (FIG. 2) having a screen 27 (which may be of insulating material, such as plastic) may be employed. This screen may be in the form of a generally cylindrical imperforate tube open at the bottom 28 and having another opening 29, near the top, for the escape of gas generated at the cathode.

The unexposed portion of the platinum wire 31 (FIG. 1) is encased in glass 32 or other suitable electrical insulating materials. While the cathode 16 is preferably of platinum, because of its resistance to corrosion, other electrically conductive, substantially non-corrosive materials, such as nickel, silver, gold or other metals of the platinum group (e.g. rhodium) or alloys thereof may be used.

The silver anode 14 may, as usual, be a silver wire having an exposed surface area of, for example, about 0.1 to 1 cm.$^2$ (depending on the magnitude of the electrolysis current to be used) whose upper, unexposed portion is fastened to any suitable electrical insulating material resistant to the solution. The anode 14 and cathode 16 are preferably rather close together (e.g. about 0.1 to ½ cm. apart) so that the electrolysis current passes through only a small portion of the solution and does not materially affect the reading of the pH electrode. The anode may have the usual provisions for renewal during use; for example, the support may carry a piece of silver wire considerably longer than the exposed portion used as the anode, and this long wire may be wound on a spool so that a fresh length of wire can be drawn down from the spool as needed.

The amperometric electrodes 17, 18 may be of conventional construction. For example, they may be parallel silver wires about 0.1 cm. in diameter, each exposed to the solution over a length of about 1.5 cm. and sealed, above their exposed portions in a suitable electrical insulating material 33 resistant to the solution.

The stirrer 19 shown in FIG. 1 is of the rotating type having a stirring element 34 mounted at the base of a vertical rotatable shaft 36 which is driven by the frictional engagement of a drive wheel 37 with a cooperating wheel 38 fixed to the stirrer shaft.

The bubbler 21, which serves to introduce a stream of air into the solution being analyzed so as to flush out substantially all the carbon dioxide, may be made up of a piece of tubing (e.g. of plastic) open at its lower end and connected to a source of air under slight superatmospheric pressure (e.g. an air pump). For very high precision in analysis the air may be freed from $CO_2$ and other impurities by appropriate means but this has not been found to be necessary.

The glass electrode 22 may be a "combination-electrode" of well known construction, having the junction for a reference electrode at its base (as described, for example, by R. G. Bates "Determination of pH: Theory and Practice," pub. by J. Wiley & Sons, New York, 1964, as at p. 331). It may be inserted at a slight angle, as shown, so as not to interfere with the operation of the stirrer. As indicated previously, it is preferably relatively far from the anode 14 and cathode 16 to reduce the effect of the electrolysis current on the reading of the pH electrode.

A combination electrode is preferred, to save space in the electrolysis cell, but an ordinary glass electrode in combination with a reference electrode may be employed instead.

Typically, the container 13 is a cylindrical glass vessel about 2 cm. in diameter and 4 cm. high and is filled with 0.1 ml. of serum and 4 ml. of titration solution, to about its 2.5 cm. level.

The parts intended to be in contact with the solution should of course be made of materials which do not, on contact with the solution during the analysis period, affect the composition (e.g. its chloride content, or acidity) except, it will be understood, for the effects of the electrolysis as described above.

Figure 3:
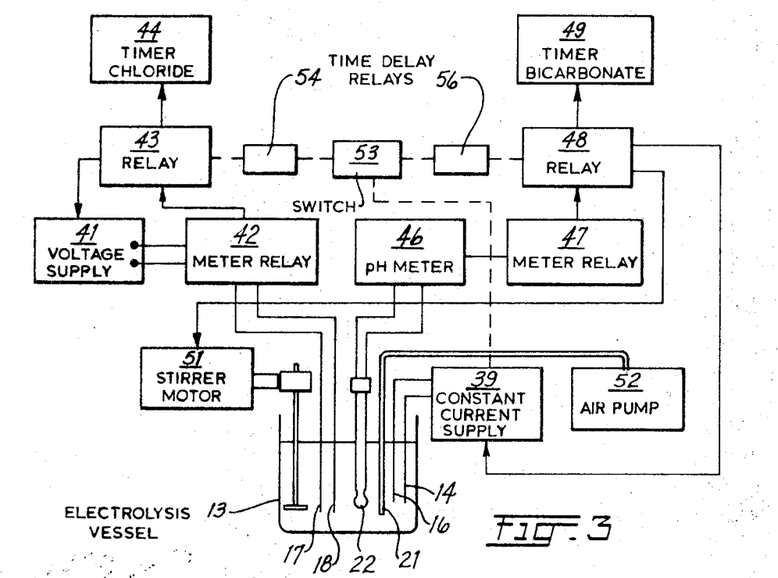
FIG. 3 is a schematic view of the operating and detecting apparatus connected to the elements of FIG. 1.

As shown schematically in FIG. 3, the electrolysis current is supplied to the cathode 16 and anode 14 by a constant current power supply 39. This may be of conventional construction in which a D.C. power supply (having a voltage output of 300 volts, for example) is connected to the cathode and anode in a circuit having a large, adjustable, resistance (e.g. about 50 kilo-ohms); in series with the cathode and anode; this arrangement assures the flow of a constant current regardless of small resistance changes in the rest of the electrolysis circuit.

The voltage supply 41 for the amperometric electrode pair 17, 18 may also be of conventional type designed to assure a constant voltage. Thus it may simply comprise a common 1.5 volt flashlight battery connected, through an ordinary voltage divider circuit, to supply 0.25 volt D.C. to the amperometric electrode pair. Or it may be furnished from the usual 115 v. A.C. power supply through standard electric circuitry consisting of a transformer, rectifier and capacitor. In any event, it is connected to the amperometric electrodes through a meter relay 42 which is pre-set to operate when the current flowing through the solution between those electrodes rises by a predetermined amount (e.g. 10 microamperes). The meter relay 42 is arranged to switch off the flow of current to a relay 43 which, in turn, acts to switch off the flow of current to a timer 44 having a direct readout (indicating chloride content). This circuitry is of the type described in the article by Cotlove and Nishi, previously mentioned.

As is well known, a meter relay is a combination of a relay and an indicating meter; in one conventional type, when the indicating needle moves to a predetermined position it closes a circuit causing current to flow to actuate the relay. The timer may comprise a synchronous motor, of the type commonly used in electric clocks, driving a mechanical digital counter having, for instance, four digit wheels registering multiples of $1/10$ second.

A similar arrangement is used for the circuits involving the pH electrode 22 and the corresponding readout indicating bicarbonate content. A conventional pH meter 46 (e.g. the "Metrion IV" model, made by Coleman Instruments, Maywood, Ill.) may be connected to the pH electrode and the output of the meter modified so that all its output current (which ordinarily is simply used for indicating the pH value on the front of the meter) is now also passed through the meter relay 47; that is, the indicating meter of the standard pH meter is connected in series to meter relay 47 which is pre-set to be actuated when that output current corresponds to a pH value of, say, 7.4, which is the value generally considered to be the most desirable endpoint in titrations for clinical determination of bicarbonate outlet. The meter relay 47 in turn operates a relay 48 which controls a second timer 49 (in the same manner as indicated above for meter relay 42, relay 43 and timer 44). However, the second timer can, as discussed earlier, be calibrated in reverse so that its numerical reading decreases with time. This gives a direct readout of the bicarbonate content.

Relay 48 is also connected to the electrical circuits of the constant current supply 39 and the stirrer motor 51, so as to stop the electrolysis current and the stirring automatically when the acid-base endpoint is reached and the timer 49 is stopped.

The air to the bubbler 21 may be supplied by a low-powered electrically driven air pump 52 which may, for instance, be of the type used to aerate home aquaria.

In operation, the vessel 13 containing the serum and the titration solution is placed in position in which the various electrodes of the device are immersed in the solution, as indicated in FIGS. 1 and 3. The bubbler and stirrer are placed in operation and the circuit connecting the voltage supply 41 to the amperometric electrodes is closed; a small background current therefor flows through the solution between these electrodes. In order to start the electrolytically generated silver ion will be reached. the flow of electrolysis current through the solution and also starts timers 44 and 49. The electrolysis is now proceeding and the endpoint of the titration of chloride with the electrolytically generated silver ion will be reached.

At this point, an excess of silver ion will occur in the solution giving rise to an elevation of current flowing through the amperometric electrode pair and also through meter-relay 42. The pre-set contact in meter-relay 42 is closed which actuates, in turn, relay 43. Relay 43 shuts off timer 44 and the 0.25 voltage supply 41 for the amperometric electrodes. The electrolysis current is, however, not interrupted and continues until the pH meter 46 indicates that the endpoint of the base titration has been reached. A this time, the meter relay 47, which had been pre-set for the desired pH endpoint, closes its contact which actuates relay 48. Relay 48 stops timer 49, the electrolysis current, and the stirrer motor. The analysis is now completed and timers 44 and 49, indicating the chloride and the bicarbonate concentrations, respectively, can be read. After removal of the analysis solution, a brief rinse of the electrodes, and the re-set of the timers, the apparatus is ready for the next analysis.

As in the circuit described by Cotlove and Nishi, the circuit used in this invention desirably includes adjustable time delay relays 54, 56 (for the drives for the timers) and an adjustable resistor (in the electrolysis circuit). When the flow of electrolysis current starts, the time delay relays are actuated and after a delay relays are actuated and after a delay of a few seconds, they, in turn, start the timers; the time delay relays are manually adjustable so that the delay time may be pre-set, in accordance with preliminary trials, to compensate for the blank value (delay time) in the titration and endpoint detection. The resistor in the electrolysis circuit is adjustable so that the electrolysis current may be pre-set to such a level that the numbers on the timer will give a direct reading of the number of equivalents of $HCO_3^-$ and $Cl^-$ in all future analyses using the same dilution solution and the same quantities of serum and dilution solution. A simpler model can, of course, be operated manually, without the time delay relays.

The values read off the timers 44, 49 can be converted to concentrations in several ways: As in any other analysis, they can be read off plots prepared from calibration runs or they can be computed on the basis of calibration runs. In one preferred form, however, the counters are calibrated directly in milliequivalents, as described by Cotlove and Nishi for the chloride titrator only. For the preferred embodiment of the present invention (addition of Ag and H+), counter 44 (for chloride) starts at 85 meq. (when one uses a dilution solution supplying $8.5 \times 10^{-5}$ mols of silver ion per ml. of serum) and counts up, while counter 49 (for bicarbonate) starts at 75 meq. (when one uses a dilution solution supplying $7.5 \times 10^{-5}$ mols of hydrogen ion per ml. of serum) and counts down. The calibration of this direct-readout apparatus includes the adjustment of the time delay relays and of the electrolysis current on the basis of calibration runs, using two serum samples with known (high and low) $HCO_3^-$ and $Cl^-$ contents. When the relationship of anode and cathode is such that side reactions take place to an appreciable extent (e.g. the previously discussed reaction to form silver at the cathode) giving a decreased current efficiency, the instrument can still be adjusted readily to give an accurate direct readout, as by separate adjustment of the speed at which timer 44 is driven. For example, if the current efficiency for production of hydroxyl ions is found, on calibration, to be 90%, the drive mechanism for timer 49 should be regulated so that the speed of timer 49 is 90% of the speed of timer 44. When an electronic direct readout system is used the same effect can be attained by conventional adjustment of the amplification factor of the circuit.

As mentioned, the timers may be of conventional type, using synchronous motors. Other types of devices for measuring the quantity of electricity may be employed. One well known timing device gives its reading in terms of voltage; it uses a potentiometer, driven at a constant rate so that the output voltage increases linearly with time.

Electronic devices such as those having suitable adder circuits or inverting coefficient circuits may be employed.

The following example is given to illustrate this invention further.

EXAMPLE

In this example, the electrode arrangement of FIGS. 1 and 3 is employed.

0.1 ml. of human blood serum (in this case, the supernatant obtained after natural clotting of drawn blood) is pipetted into a cylindrical glass sample cup, about 1.7 cm. in diameter and 4 cm. high, and there is added 4.0 ml. of an aqueous (chloride-free) solution having a concentration of 2.125 mM. in $AgNO_3$, 1.875 mM. in $HNO_3$ and 0.1 M in $KNO_3$. Before the addition of the liquids the interior of the cup is sprayed with a silicone (Dow-Corning Antifoam A) to prevent foaming during the subsequent bubbling of air through the liquid.

The arrangement shown in FIG. 1 is then inserted into the cup. The glass electrode is a commercially available "combination electrode" having a diameter of about 0.75 cm. The two vertical, parallel silver wires used as amperometric endpoint detectors are each about 0.1 cm. in diameter and are spaced 0.25 cm. apart and are each exposed to the solution for a length of about 1.5 cm. The vertical silver anode is also about 0.1 cm. in diameter and is exposed in contact with the solution for a length of about 0.8 cm. The cathode is a platinum wire 0.033 cm. in diameter having an exposed length of only 0.1 cm.; it is spaced 0.2 cm. below the bottom of the anode at a distance therefrom, measured horizontally, of about 0.3 cm. The glass electrode is calibrated prior to use by inserting it into a commercial buffer solution having a known pH of 7.41. (A pH of about 7.4 is a desirable endpoint in bicarbonate titrations.) The response time of the glass electrode is also determined and it is found that the lag in response is such that (when one uses a constant electrolysis current of 6.2 milliamperes) when the pH as indicated by the glass electrode rises to 7.15 the actual pH in 7.4. The conventional adjustable contact of meter-relay 47 is therefore set to make that meter-relay respond at a voltage corresponding to that of the glass electrode when in a solution at an unvarying pH of 7.15.

The bubbling is started and the electrolysis of the solution is then carried out with a constant current of 6.2 milliamperes between the anode and cathode, while the stirrer is driven at a rate of about 300 r.p.m. and a voltage of 0.25 volt D.C. is maintained across the amperometric electrodes.

Using known amounts of chloride and bicarbonate in the serum, it is found that the equipment responds linearly to both chloride and bicarbonate ion, within an accuracy of better than 1%.

In the foregoing example, the added $KNO_3$ serves as a supporting electrolyte, as previously discussed.

When this example is repeated, with 10 mg. of gelatin included in the diluted sample (the gelatin being added as a freshly prepared gelatin solution) the results are unchanged.

The method of this invention can be adapted for use in an automated analyzer of the continuous flow type. In the embodiments illustrated in FIGS. 4 and 5, the mixture of serum and diluent (e.g. acid plus silver nitrate, supporting electrolyte and other additives) is pumped in a stream whose path brings the mixture into contact with a cathode 61 and silver anode 62 so that an electrolysis current passes through the mixture, between the cathode and anode. The stream of the electrolyzed mixture also passes endpoint detectors, which may be an amperometric pair of electrodes 63 and a pH electrode 64. During the flow of the stream the total quantity of electricity per unit volume (coulombs per cc.) of mixture is varied, and the two quantities which correspond to the endpoints are detected. This is conveniently done by pumping the stream at a constant predetermined velocity while increasing the electrolysis current linearly with time, as by continuously decreasing the resistance of the large resistor (which is in series with the D.C. power supply, cathode and anode, and which may be, for example, a conventional driven turning potentiometer) in synchronism with the timers (used for the endpoint detectors) previously described. Each of the timers may be suitably calibrated by the use of solutions of known concentrations; such calibration will inherently compensate for the time delay for the passage of the electrolysis solution from the silver anode to the endpoint detector associated with the particular timer. Alternatively, the electrolysis current can be kept constant while the pumping rate is decreased linearly with time.

Figure 4:
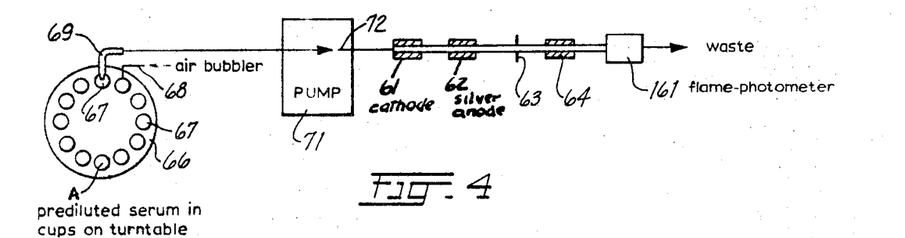
FIGS. 4 to 6 show a stream flow system using similar elements, FIG. 4 showing a system using prediluted serum, FIG. 5 showing a system in which there is automatic dilution, and FIG. 6 showing a system in which loss of silver from the anode is reduced.

In FIG. 4 (which is the simplest of the three embodiments shown in FIGS. 4 to 6), the prediluted serum is supplied, as at position A, to a conventional turntable 66, which advances the containers 67 carrying the samples (which containers are commonly called "sample cups") stepwise, from position to position, at a predetermined constant rate in one direction, the turntable being driven by any suitable timed drive arrangement. The prediluted serum is subjected to the action of an air bubbler 68 (to remove substantially all the $CO_2$ generated on its acidification, as described previously) and then is taken up by a sample aspirating tube 69 of conventional construction (e.g. of the type used in the well known Auto Analyzer, as described by the Handbook of Clinical Laboratory Data, pub. by Chemical Rubber Co., Cleveland, Ohio, 1965, at p. 219). A stream of the sample is then forced by any suitable pump 71 (such as a positive displacement pump, e.g. a peristaltic action pump having a roller acting on flexible tubing, as described in the "Handbook" just mentioned, at pp. 219 and 220, or a piston pump) at constant rate, through a tube 72, past the cathode 61, anode 62 and endpoint detectors 63 and 64.

Figure 5:
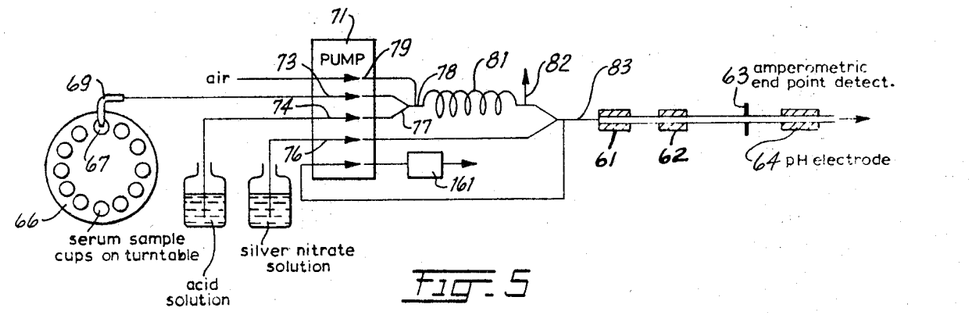

In the embodiment shown in FIG. 5, the dilution of the serum and the flushing with air are effected after the serum has been aspirated, by the aspirating tube 69, from its container 67 on the turntable 66, the dilution being accomplished in the same manner as in the Auto Analyzer (as described on pp. 219 and 220 of the previously cited "Handbook . . ." and in the article by L. T. Skeggs entitled "New Dimensions in Medical Diagnosis" in Analytical Chemistry, 38 [May, 1966], pp. 31A–44A) by passing the serum and the diluents at predetermined rates through flexible tubes 73, 74, 76, which are simultaneously acted upon by a peristaltic type pump 71. As in the Auto Analyzer, the ratios of the cross-sectional areas of the flexible tubes 73, 74, 76 are the same as the ratios of the desired relative volumes of the contents of the respective tubes. The acid-containing tube 74 and the serum tube 73 merge (at 77) so that $CO_2$ is formed in tube 78. As is usual in the operation of the Auto Analyzer, air is fed at a controlled rate (by the action of pump 71 on air tube 79) into admixture with the diluted sample, the air serving to segment the stream flowing through tube 78 (e.g. forming a stream having short liquid sections of, say, ¼ inch length and similar short air sections). The segmented stream is fed to a coil 81 (or other unit which allows prolonged contact of the air and liquid so that substantially all the $CO_2$ generated by the acidification is released to the gas phase). After a relatively long residence time in the coil, the mixture flows past a vent 82, of conventional construction, for the escape of the air and $CO_2$. Downstream of the vent 82 the tube 78 merges with the silver nitrate solution tube 76 and the resulting mixture flows through tube 83 past the cathode 61, anode 62, and endpoint detectors 63 and 64.

It will be understood, of course, that a stream of mixture of the acid and silver nitrate dilution solutions may be used in place of the separate streams of these materials.

Figure 6:
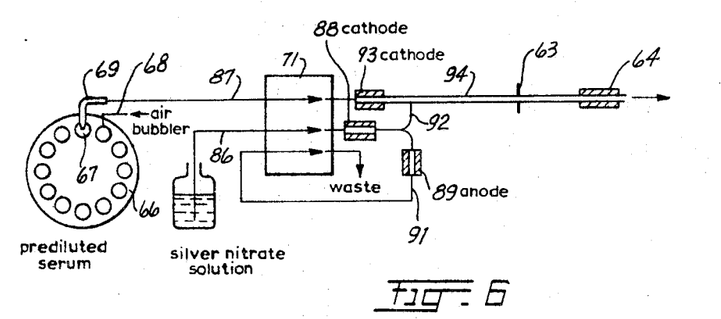
Figure 11:
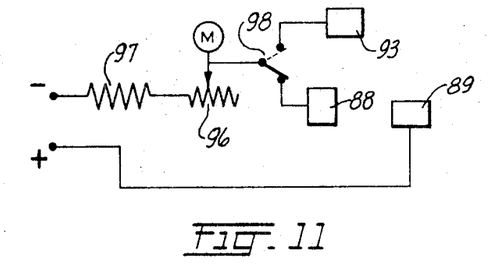
FIG. 11 shows schematically a portion of the electrolysis current circuits of the system of FIG. 6.

In the embodiments shown in FIGS. 4 and 5 (as in FIGS. 1 and 3) anodic dissolution of the silver anode occurs; FIG. 6 illustrates an embodiment in which this is prevented by using a system in which the final addition of silver ions, in amount sufficient to attain the endpoint, is effected by the addition of a diluent stream whose silver ion content is varied in a controlled manner. This is, of course, different from the embodiment in FIG. 5 in which the diluent stream supplies a constant, but insufficient, amount of silver ions and in which the final portion of silver ions is supplied by the electrolysis. In FIG. 6, the silver content of the silver diluent solution and the rate at which the solution is pumped through its supply tube 86 are such as to supply more than enough silver to combine with all the chloride in the stream of acid-diluted sample in tube 87, but a varying portion of the silver ion is removed from the silver diluent solution by electrolysis before that diluent solution is mixed with the stream of sample. More particularly, the silver diluent solution in tube 86 passes in contact with a cathode 88, on which silver is plated out by electrolysis. In order to avoid contaminating the diluent solution by the anode products of the electrolysis, the anode 89 is positioned in contact with a small side stream of the silver diluent solution (in tube 91) which goes to waste; this anode 89 can be of any suitable material, preferably corrosion-resistant, and need not be made of silver. The main stream of silver diluent solution (of lowered silver content) passes, through a tube 92, to merge with the stream of sample in tube 87 after the acidified sample has passed over another cathode 93 (where hydroxyl ions are formed by an electrolysis current between it and the same anode 89). The resulting blend travels as a stream through a tube 94 past the endpoint detectors 63, 64. The analysis is carried out sequentially; for example, an electrolysis current which increases linearly with time may be passed through the circuit of anode 89 and cathode 88 until the chloride endpoint is reached, and then an electrolysis current which also increases linearly with time is passed through the circuit of anode 89 and cathode 93, until the acid-base endpoint is reached. For this purpose the circuit illustrated in FIG. 11 may be used; here the increase in current is effected, in each case, by driving (with a suitable motor) the movable contact of a rheostat 96 in series with a large resistor 97. A switch 98 serves to close the circuit of cathode 88 and then to open that circuit and close the circuit of cathode 93. The switch 98 may be arranged to be operated automatically (as by a timer cam) at a given time, after analysis has begun, sufficient for the attainment of the first endpoint; for example, the switch may be in its first position for 30 seconds for the determination of the chloride endpoint, and in its second position for the next 30 seconds for the determination of the acid-base endpoint. The switch 98 can also be operated by the meter-relay associated with the chloride-detecting circuit, so as to move it from its first position to its second position as soon as the chloride endpoint is reached, and conventional elements may be used to return the contact of the rheostat to its original position. Other switching arrangements will be obvious to those skilled in the art.

The tube 91 for the side stream passes through the same peristaltic pump 71 as is used to pump the other streams, the size of the tube 91 being, of course, much smaller than the size of tube 86, so that only a small predetermined part of the silver diluent solution is sent to waste, the other part, as previously indicated, being passed through the tube 92 for admixture with the sample stream.

In the embodiment shown in FIG. 5, the dilution of the serum with acid may, of course, be effected continuously, as in the manner shown in FIG. 5.

Figures 7, 8, 9:
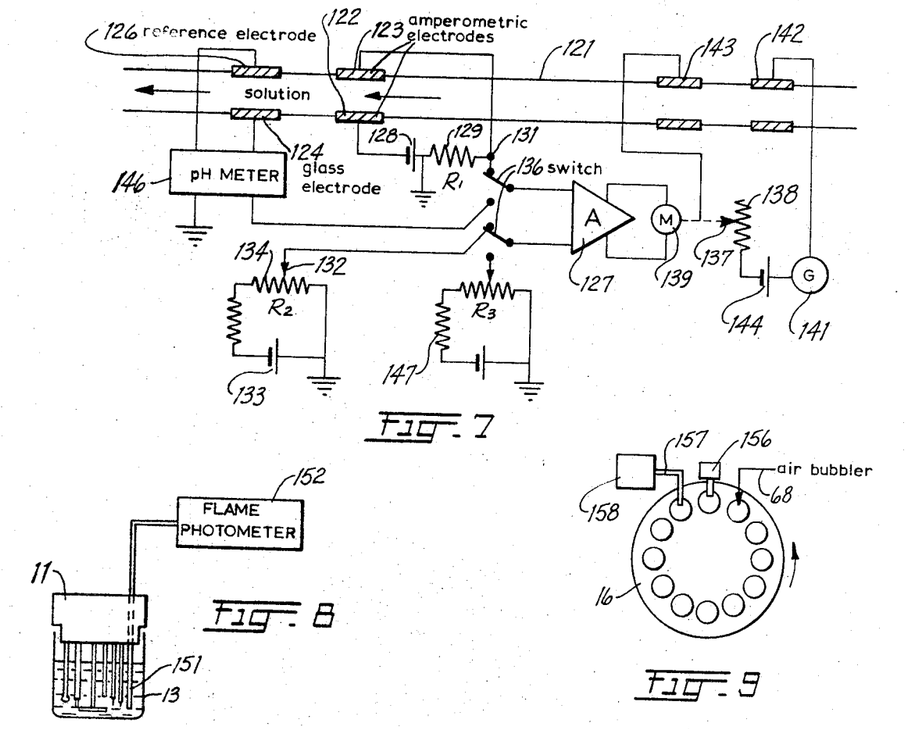
FIG. 7 illustrates schematically a modified stream flow system using a feedback arrangement.
FIG. 8 illustrates a batch system with a flame photometer.
FIG. 9 illustrates a more automated batch system with a flame photometer.

When, as in the embodiments illustrated in FIGS. 4 to 6, a flowing stream method is used, the electrolysis current may be varied, as by suitable feedback circuitry illustrated in FIG. 7, to achieve a steady state for each endpoint. Here, as in FIGS. 4 to 6, the solution flows through a tube 121 past a pair of amperometric electrodes 122, 123 (for detecting the chloride endpoint) and a glass electrode 124 and reference electrode 126 (the latter two serving for the detection of the acid-base endpoint). A differential amplifier 127 compares the input voltage from each of these detecting systems with a precalibrated standard input voltage and in each case changes the electrolysis current until the input voltage from the detecting system is equal to the standard.

More particularly, in FIG. 7 the amperometric electrodes 122, 123 are in a series circuit which includes a fixed voltage power source 128, one terminal of which is connected to ground, and a resistor 129, so that the voltage (to ground) at a point 131 is a measure of the amperometric current. The standard voltage (to ground) used for the comparison is taken off at a point 132 of a reference circuit having a fixed voltage power source 133, a rheostat 134 (the adjustment of which is pre-set during calibration) and a connection to ground. A double pole double throw switch 136 serves to connect these two voltage inputs simultaneously to the operational amplifier 127. The output voltage of the operational amplifier drives the movable contact 137 of a large rheostat 138 (through which the electrolysis current passes), a suitable reversible motor, such as a D.C. motor 139, being provided for this purpose. The operational amplifier of conventional construction is arranged to thus vary the electrolysis current in a direction to reduce the difference between the two inputs of the amplifier until a steady state is attained at which the amperometric voltage input is equal to the reference voltage input. When this steady state is reached, the steady reading of a galvanometer 141 in the D.C. electrolysis circuit is a measure of the chloride concentration. As in embodiments described earlier, the electrolysis circuit includes a cathode 142, an anode 143 and a constant voltage power supply 144.

For measuring the acid-base endpoint, the same operational amplifier 127, rheostat 138 and galvanometer 141 are used, but the switch 136 is moved to supply the input terminals of the operational amplifier with (a) the voltage (to ground) of a pH meter 146 in series with the glass electrode 124 and reference electrode 126, and (b) a suitable predetermined standard voltage (to ground) from adjustable circuit 147. The steady reading of the galvanometer 141 then is a measure of the bicarbonate concentration.

It will be understood that the switch 136 may be operated manually. It can also be arranged to be operated automatically (as by a timer cam) at a given time, after analysis has started, sufficient for the attainment of the first endpoint; for example, the switch may be in its first position for 30 seconds for the determination of the chloride endpoint, and in its second position for the next 30 seconds for the determination of the acid-base endpoint. Alternatively, it can be arranged (in a manner which will be obvious to those skilled in the art) to operate automatically after the steady state is reached and after a suitable recording has been made of the value of the steady state electrolysis current.

An important aspect of the invention is the fact that its analytical procedure is especially adapted to that required in the analysis for sodium and potassium by flame photometry. Before, and after, both the chloride endpoint and the pH endpoint have been reached (as described above) the solution is at a dilution suitable for flame photometry, and it may be fed to a conventional flame photometer by any suitable means. To internally standardize the flame it is best to include a lithium salt with the acid and silver salt used for diluting the serum; a typical aqueous reagent solution, 5 ml. of which is used to dilute 0.1 ml. of serum, has the following concentrations of dissolved ingredients: 75 mM. $LiNO_3$ 1.5 mM. $HNO_3$ and 1.7 mM. $AgNO_3$. A suitable wetting agent, such as the nonionic polyethoxylated material known as "Sterox" made by reacting ethylene oxide and a higher fatty alcohol, may be present in the reagent solution, as in a concentration of 0.02% by weight, to promote a fine dispersion of the solution in the atomizer of the flame photometer. Gelatin may also be added. In the solution, described above, containing 15 mM. $LiNO_3$, the lithium salt serves both as an internal standard for flame photometry and as a supporting electrolyte for the electrolysis. It is also within the broad scope of the invention to use much smaller amounts of lithium (e.g., in a concentration of 10 mM.) while using other materials for the supporting electrolyte (e.g., ionizing non-buffering organic compounds). Other ions, such as rubidium or cesium, may also be employed as internal standards for flame photometry. Of course, if the flame photometer is of the type which does not have provision for internal standardization (i.e., comparison of the light emissions for the Na and K with that of a standard amount of another element) one need not add the Li salt for this purpose. When the lithium salt is used to supply both the internal standard and the supporting electrolyte its concentration is preferably within the range of about 20 mM. to 500 mM., more preferably in the range of about 20 mM. to 200 mM.

Typical flame photometers which may be used are described in the books "Clinical Chemistry" by J. S. Annino, published 1956 by Little Brown and Co., pp. 93–108, and "Flame Photometry" by J. A. Dean, McGraw-Hill, 1960. An absorption-flame photometer may also be used. Alternatively, a system using ion-specific glass electrodes of known type may be used to measure Na and K concentrations.

One suitable apparatus for flame photometry is shown schematically in FIG. 8 in which the supporting block 11 carries not only the elements shown in FIG. 1 but also an aspirating tube 151, of conventional type, for sucking a portion of the solution into the flame photometer 152. The action of aspirating tube 151 may be started by a switch operated by, for example, relay 48 of FIG. 2 so that the removal of liquid by the aspirating tube commences at the conclusion of the chloride and bicarbonate analyses; the switch may, of course, be actuated manually.

The four-electrolyte analysis (for $Cl^-$, $HCO_3^-$, $Na^+$ and $K^+$) described above may also be carried out using a turntable, as illustrated in FIG. 9. The turntable may be of the same type as shown in FIG. 3. At successive positions there are automatically lowered into each sample cup 66: (a) a bubbler 68; (b) an electrode assembly 156 of the construction shown in FIGS. 1 and 2; and (c) an aspirator 157 for removing a portion of the solution for delivery to a flame photometer 158. Thus each sample is subjected first to the bubbling of gas to expel carbon dioxide, then, after a one-step advance of the turntable, to the electrolytic analysis for $Cl^-$ and $HCO_3^-$, and finally, after the next one-step advance, to flame photometry. Well known conventional mechanism may be used for lowering the elements 68, 156 and 157 into the sample cups when each cup reaches a position below such an element and for raising those elements just prior to the next advance of the turntable. Alternatively, as is well known in the art, these elements may be stationary and the turntable may be of the type which automatically rises just after each stepwise advance to bring the contents of the sample cups into contact with those elements and then automatically lowers to free the cups from these elements just before the next stepwise advance of the turntable.

The embodiments shown in FIGS. 4 to 6 are readily adaptable to flame photometry. Thus a flame photometer 161 (FIGS. 4 and 5) may have its inlet arranged to receive the electrolyzed mixture after it passed the endpoint detectors (as shown in FIG. 4) or to receive a small sidestream of the mixture before electrolysis (as shown in FIG. 5) or at any other point in the system.

Figure 10:
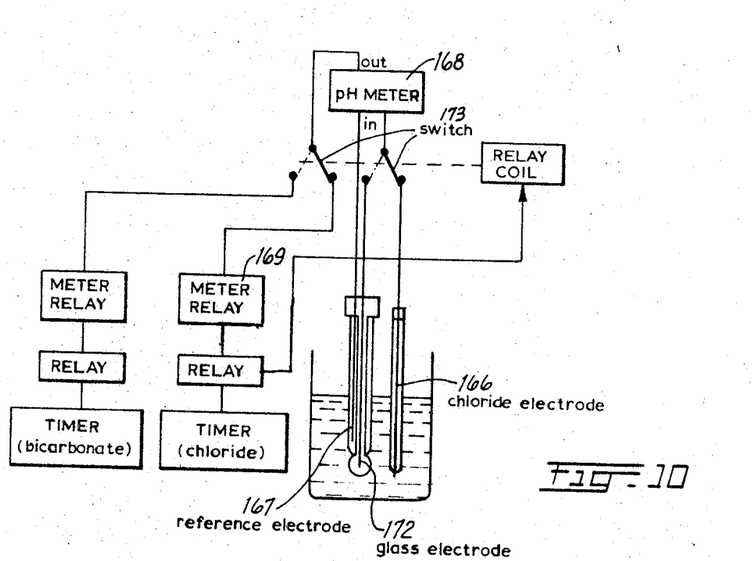
FIG. 10 is a partial schematic view of a system for detecting both endpoints potentiometrically.

While less desirable, it is within the broader scope of the invention to employ other methods for detecting the endpoints. For example, the acid-base endpoint may be determined colorimetrically by including an acid base indicator (such as phenol red, which turns red at about pH 8) in the reagent solution described above, and by using a known colorimetric arrangement. The latter may include a light source, a photoelectric cell acted upon by light which passes from said source through the solution during the electrolysis, and an appropriate light filter so that the change in the color of the indicator causes a change in the current through the photocell: this change is detected, in conventional manner, to actuate a meter-relay (such as meter-relay 47) which is thus responsive to the acid-base endpoint. Of course, the color change may also be detected visually and the counter (such as timer 49) which gives a reading of the bicarbonate concentration may be stopped by a manual switch actuated by a human operator when the visual acid-base endpoint is reached. As illustrated in FIG. 10 the chloride endpoint may be detected potentiometrically, as by replacing the amperometric electrodes with a suitable chloride-responsive electrode 166 (such as the well known silver/silver chloride electrode) and a reference electrode 167; these electrodes may be connected to a suitable voltmeter 168 (such as a well known pH meter) to detect the change in voltage at the chloride endpoint and to actuate a meter-relay 169 and control a timer 171, which is thus responsive to the chloride endpoint. A single reference electrode 167 may be used with both the pH electrode 172 and the chloride-responsive electrode and (by suitable circuit arrangements, as shown) a single voltmeter (pH meter) 168 may be used for both the potentiometric chloride endpoint determination and the potentiometric acid-base endpoint determination, the voltmeter 168 being automatically switched (as by a suitable relay-operated double-pole double throw switch 173) from the chloride-responsive electrode circuit to the acid-base-responsive electrode circuit after the chloride endpoint is reached.

While also less desirable, it is within the broader scope of the invention to employ other methods than electrolysis for incorporating the silver ion and hydroxyl ion for attaining the endpoints. Thus, after the serum has been mixed with the acidic reagent solution (which may contain silver ions, as previously described) and the carbon dioxide has been expelled, the solution may be titrated, successively or even simultaneously, with an aqueous silver nitrate solution and an aqueous solution of a base (e.g. aqueous NaOH). The titration may be effected manually or with conventional automatic titrators controlled, in the same way as the electrolysis is controlled, by the endpoint-detecting electrodes (or colorimeters) previously described. The automatic titrators may be of the type in which a motor driven piston gradually forces the titrating liquid from a burette, and the two motors of these automatic titrators may be connected to the detecting system in the same fashion as the two timers described previously; as is also conventional, the positions of their pistons at the respective endpoints may be read off digitally. Digital readout may also be obtained by a conventional type of circuit in which the motor of the timer (or of the burette piston) drives the movable contact of a potentiometer to continuously change the output voltage of the latter; this output voltage is fed to an operational amplifier, whose gain (slope) may be calibrated by pre-setting of a rheostat through which the output voltage is fed to the amplifier, and the output voltage of the amplifier is displayed at a digital voltmeter; the zero point may be pre-set by adjusting another rheostat, in series with the potentiometer.

The reference electrode in the combination glass electrode used for measuring pH may be a silver-silver chloride electrode with an aqueous saturated potassium nitrate solution (in contact, of course with potassium nitrate crystals) as electrolyte. I find that the use of a reference electrode whose electrolyte solution is substantially free of chloride ion, silver ion or any other ion which forms an insoluble compound with the chloride or silver ion gives better results, in long term use, than when the electrolyte of the reference electrode contains such ions. Thus the use, as the reference electrode, of a silver-silver chloride electrode having an aqueous saturated KCl solution in contact therewith gives excellent results at first, but can become unstable, due, I believe, to clogging of the liquid junction (between the solution being tested and the electrolyte of the reference electrode) by insoluble silver chloride produced by reaction of the silver ions in the solution with chloride ions of said electrolyte. Examples of other reference electrodes free of the aforementioned ions are the calomel electrode (Hg; HgCl) with a $KNO_3$ electrolyte, the usual quinone-hydroquinone electrode, or an electrode having a stable redox couple such as $Fe^{3+}/Fe^{2+}$ in acid solution.

It is advantageous to employ means for decreasing the tendency of the solution being tested to diffuse into the electrolyte of the reference electrode. This may be effected by placing a barrier across the usual junction opening in the glass container which houses the reference electrolyte, so as to lengthen the path between the main, agitated, body of solution being tested and the junction and provide a quiescent zone adjacent to the junction. For example, a band of rubber or piece of cellophane may be used as the barrier. The film of the liquid between the barrier and the outer wall of that container will provide a conductive path; also, the cellophane is permeable to ions, but not to proteins in the solution.

It will be seen that in the preferred forms of the invention the solution entering the flame photometer is at most only mildly acidic. In the case in which it enters after it has been brought to its acid-base endpoint it will be neutral or slightly basic.

It is understood that the foregoing detailed description is merely given by way of illustration and that many variations may be made therein without departing from the spirit of the invention. The "Abstract" given above is merely for the convenience of searchers and is not to be given any weight in defining the scope of the invention.

In this application all parts are by weight, unless otherwise indicated.

It is understood that the same analyses as described herein can be used not only for the usual blood serum (i.e. the supernatant liquid produced by allowing drawn blood to coagulate) but also blood plasma, which is usually obtained by centrifuging uncoagulated blood containing an anti-clotting agent. Since the essential difference between serum and plasma is only a small protein fraction and the methods of the invention are not subject to protein interference, the term "blood serum," as used herein, is intended to include blood plasma also.

What is claimed is:

1. Process for analyzing blood serum for chloride and bicarbonate ion which comprises acidifying said serum by adding a predetermined amount of hydrogen ion in excess of $2 \times 10^{-5}$ mols of hydrogen ion per ml. of the serum whereby to form an acidic test sample, removing from said sample the dissolved carbon dioxide generated by said acidification, and titrating said sample both with silver ion and hydroxyl ion to determine the chloride and acid-base end points on the sample, said titration being a coulometric titration in which an electrolysis current is passed through said test sample between an anode and a cathode at which hydroxyl ions are generated in said sample.

2. Process as in claim 1 including the step of supplying a diluent solution containing a controlled amount of silver ion more than equivalent to the chloride content of the test sample and passing an electrolysis current through said diluent solution to decrease the silver content of said diluent solution and adding the diluent solution of decreased silver content to the acidic test sample.

3. Process as in claim 1 in which a stream of the acidified test sample is fed past said cathode, while said electrolysis current flows through said stream, and then past detectors for said chloride and acid-base endpoints.

4. Process as in claim 1 in which the anode comprises silver and in which said electrolysis current simultaneously generates silver ions at said anode and the hydroxyl ions at the cathode.

5. Process as in claim 4 in which the acidification is effected by addition of an aqueous solution substantially free of ions that form water insoluble salts with silver ions.

6. Process as in claim 4 in which the serum is mixed also with a predetermined amount of dissolved silver ion to precipitate a predetermined amount of the chloride of said serum as silver chloride and to form a test sample, of reduced chloride content, through which said electrolysis current is then passed, said predetermined amount of added dissolved silver ion being less than $10^{-4}$ mol per ml. of serum.

7. Process as in claim 6 in which said predetermined amount of dissolved silver ion is in the range of about $5 \times 10^{-5}$ mol to $10^{-4}$ mol per ml. of the serum, and said acidification is sufficient to add about $2.5 \times 10^{-5}$ to $1 \times 10^{-4}$ mol of hydrogen ion per ml. of the serum, whereby the chloride endpoint occurs no later than about the same time as the acid-base endpoint.

8. Process as in claim 4 in which there is incorporated into said test sample, prior to said electrolysis, a supporting electrolyte comprising a monovalent cation whose chloride salt is water soluble.

9. Process as in claim 8 in which the concentration of the added cation in the test sample is in the range of about 0.01–0.5 M.

10. Process as in claim 9 in which the cation is lithium ion.

11. Process as in claim 10 in which the lithium is added as lithium nitrate in concentration of about 20 to 200 mM.

12. Process as in claim 11 in which the acidic test sample contains less than about $10^{-3}$ mols of hydrogen ion per ml. of serum, and the test sample after said titration is passed through a flame photometer.

13. Process for analyzing blood serum for biocarbonate ion which comprises acidifying said serum by adding a predetermined amount of hydrogen ion in excess of $2 \times 10^{-5}$ mols of hydrogen ion per ml. of the serum wherby to form an acidic test sample, removing from said sample the dissolved carbon dioxide generated by said acidification, and titrating said sample with hydroxyl ion by passing an electrolysis current through said test sample between an anode and a cathode at which hydroxyl ions are generated to determine the acid-base endpoint of the sample.

14. Process as in claim 13 in which an anti-foam agent is present in said acidified sample.

15. Process as in claim 13 in which a stream of said acidified sample is fed past said cathode, while said electrolysis current flows through said stream, and then past a detector for said acid-base endpoint.

16. Process as in claim 13 in which said acidified sample contains an acid base indicator and said acid base endpoint is determined colorimetrically.

17. Process as in claim 16 in which said indicator is phenol red.

18. Process as in claim 13 in which at least part of the same sample is passed through a flame photometer to determine its sodium and potassium content.

19. Process as in claim 18 in which the serum is mixed also with a predetermined amount of a dissolved different monovalent metal ion, other than sodium and potassium, to form a test sample on which said titrations are effected, said different ion in said test sample serving as an internal standard for flame photometry.

20. Process as in claim 19 in which the different ion is supplied by the addition of a dissolved lithium salt.

21. Process for analyzing blood serum for chloride ion which comprises passing a stream of diluted serum past a silver anode and a cathode, while passing an electrolysis current through said stream between said anode and cathode to generate silver ions at said cathode, then passing said stream past a detector for the appearance of excess silver ions in the electrolyzed stream and varying the quantity of electrolysis electricity per unit volume of said flowing stream during said process until the chloride endpoint, namely the threshold of said appearance of said excess silver ions at said detector is reached.

22. Process for analyzing blood serum for chloride ion which comprises passing a supply stream of aqueous solution containing silver ion into contact with a stream of diluted serum to precipitate chloride ion therein and passing the resulting mixed stream past a detector for the appearance of excess silver ions in the mixed stream, and varying the amount of silver ion supplied by said supply stream during the process, until the chloride endpoint, namely the threshold of said appearance of said excess silver ions at said detector, is reached, said variation of the amount of silver ion supplied by said supply stream being effected by passing an electrolysis current through said supply stream to remove silver ions therefrom and varying said electrolysis current during the process.

23. Apparatus for determining bicarbonate ion in blood serum comprising means for containing a blood serum test sample which has been acidified with a predetermined quantity of acid, means for flushing out dissolved carbon dioxide generated by the acidification of said sample, means for coulometrically titrating said acidified flushed sample by passing an electrolysis current through said acidified test sample between an anode and a cathode at which hydroxyl ions are generated in said sample, to neutralize the acidity of said sample, said anode and cathode being in said liquid sample, means for detecting the acid-base endpoint of the sample on said titration, means for measuring the quantity of electricity carried during said electrolysis until said acid-base endpoint is reached, said apparatus including a connection, between said acid-base endpoint detecting means and said means for measuring the quantity of electricity carried during said electrolysis, for signalling to said measuring means that said acid-base endpoint has been reached, said measuring means including indicator means arranged subtractively to give a reading whose value decreases as said quantity of electricity increases, whereby to indicate directly the bicarbonate content of said serum.

24. Apparatus as in claim 23 in which said flushing means includes a bubbler, supplied with air under pressure, to be placed in said acidified sample.

25. Apparatus as in claim 23 in which the exposed area of cathode is less than 10% the exposed area of the anode.

26. Apparatus as in claim 23 and including means for transporting at least a part of said sample to a flame photometer for measurement of the sodium and potassium content thereof.

27. Apparatus as in claim 23 in which said acid-base endpoint detecting means comprises a glass electrode.

28. Apparatus as in claim 23 including a silver anode.

29. Apparatus as in claim 23 in which the cathode is an electrically conductive corrosion resistant solid whose area is less than one-fourth the area of said anode.

30. Apparatus as in claim 23 and including a tube for movement of a stream of said sample therethrough with said stream in contact with said cathode, said endpoint detecting means being downstream of said cathode.

31. Apparatus as in claim 30 including an anode which is out of contact with said stream whereby contamination of said stream by anode products is reduced, said apparatus providing a current path, through liquid, from said stream to said anode.

32. Apparatus as in claim 23 in which said acid-base endpoint detecting means comprises means for detecting a change in the color of an indicator in said acidified test sample.

33. Apparatus as in claim 32 in which said detecting means is sensitive to the color change of phenol red indicator at said endpoint.

34. Apparatus as in claim 23 and including a tube for movement of said sample therethrough as a stream, said electrodes being stationary and spacet apart along said stream, said endpoint detecting means being downstream of said electrodes.

35. Apparatus as in claim 34 and including a flame photometer for receiving at least a part of said sample and measuring its potassium and sodium content, said photometer having a sample inlet communicating with said stream.

36. Apparatus as in claim 34 in which said sample inlet is upstream of said electrodes.

37. Apparatus as in claim 34 in which said sample inlet is downstream of said electrodes.

38. Apparatus as in claim 34 and including means for varying, while said stream is flowing, the number of coulombs of electrolysis current per cubic centimeter of solution being electrolyzed.

39. Apparatus as in claim 23 in which said anode is of silver whereby silver ions are generated at said anode during the passage of said electrolysis current, said apparatus including means for detecting the chloride endpoint of the sample on said titration, and means for measuring the quantity of electricity carried during said electrolysis until said chloride endpoint is reached.

40. Apparatus as in claim 39 comprising a support having depending therefrom: (a) said anode and cathode, (b) a pair of amperometric electrodes for detecting the chloride endpoint, (c) a glass electrode for detecting the acid-base endpoint, (d) a rotary stirrer, and (e) a tube for introducing air bubbles into said sample for flushing carbon dioxide therefrom.

41. Apparatus as in claim 39 and including a connection, between said acid-base endpoint detecting means and said means for measuring the quantity of electricity carried during said electrolysis, for signalling to said measuring means that said acid-base endpoint has been reached.

42. Apparatus as in claim 39 in which the construction and arrangement of the electrodes is such that the current owing to silver deposition on the cathode is less than about 10% of the total current flowing between the cathode and anode.

43. Apparatus as in claim 42 in which the cathode is screened against liquid currents.

44. Apparatus as in claim 39 including two indicating counters for indicating said quantity of electricity, automatic means, responsive to the chloride endpoint detecting means, for stopping one of said counters at said chloride endpoint, and automatic means, responsive to the acid-base endpoint detecting means, for stopping the other of said counters at said acid-base endpoint.

45. Apparatus as in claim 44 in which said other counter is calibrated to count subtractively to give a reading which decreases as said quantity of electricity increases whereby said reading is directly related to the bicarbonate ion content of said serum.

46. Apparatus as in claim 44 and including delay means for starting at least one of said counters at a predetermined time after the start of the electrolysis.

References Cited

UNITED STATES PATENTS

| | | | |
|---|---|---|---|
| 2,928,774 | 3/1960 | Leisey | 204—195X |
| 3,131,348 | 4/1964 | Taylor | 204—195X |
| 2,878,106 | 6/1955 | Malmstadt | 23—253 |
| 2,950,178 | 8/1960 | Halfter | 23—253 |
| 3,073,682 | 1/1963 | Lindsley | 23—253X |
| 3,154,477 | 10/1964 | Kesler | 23—253X |
| 3,162,585 | 12/1964 | Ford | 23—253X |
| 3,275,533 | 9/1966 | Boronkay | 23—253X |

(Other references on following page)

OTHER REFERENCES

M. Rockenmacher: Am. J. Clin. Path., 33 (4), 349–354 (1960).

E. Cotlove: "Standard Methods of Clinical Chemistry," vol. 3, D. Seligson, ed., 81–92, Academic Press, New York, 1961.

Fisher Scientific Co. Catalog, 290, 1963.

JOSEPH SCOVRONEK, Primary Examiner

S. MARANTZ, Assistant Examiner

U.S. Cl. X.R.

23—253; 204—1, 195